United States Patent
Yukawa

(10) Patent No.: US 7,188,652 B2
(45) Date of Patent: Mar. 13, 2007

(54) PNEUMATIC TIRE WITH NOISE DAMPER

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 107 days.

(21) Appl. No.: 11/022,750

(22) Filed: Dec. 28, 2004

(65) Prior Publication Data

US 2005/0205183 A1 Sep. 22, 2005

(51) Int. Cl.
*B60C 5/00* (2006.01)
*B60C 19/00* (2006.01)

(52) U.S. Cl. ..................................... 152/450

(58) Field of Classification Search ............... 152/450; 156/212–214
See application file for complete search history.

(56) References Cited

U.S. PATENT DOCUMENTS

| | | | |
|---|---|---|---|
| 4,370,374 A * | 1/1983 | Raabe et al. ............ | 156/213 X |
| 4,399,851 A | 8/1983 | Bschorr | |
| 6,729,373 B2 | 5/2004 | Yukawa et al. | |
| 2005/0155686 A1 * | 7/2005 | Yukawa et al. ............ | 152/450 |

FOREIGN PATENT DOCUMENTS

| | | | |
|---|---|---|---|
| DE | 1 010 398 B | | 6/1957 |
| DE | 29 34 522 A | * | 3/1981 |
| EP | 1184207 A2 | | 3/2002 |
| EP | 1 253 025 A | | 10/2002 |
| JP | 2002-67608 A | | 3/2002 |
| JP | 2002-144809 A | | 5/2002 |
| WO | WO-03/103989 A1 | * | 12/2003 |

OTHER PUBLICATIONS

Webster's New World Dictionary of American English, Third College Edition, ed. Victoria Neufeldt and David Guralnik, Simon & Schuster, Inc., New York, 1988, p. 1509.*

* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire with a noise damper made of a spongelike multi-cellular material is disclosed. The noise damper is divided into small dampers to improve the high-speed durability of the tire. The noise damper is provided with a water-impermeable outer coating to prevent water from infiltrating into the spongelike multi-cellular material during transporting, store keeping and the like.

10 Claims, 14 Drawing Sheets

PNEUMATIC TIRE WITH NOISE DAMPER

FIELD OF THE INVENTION

The present invention relates to a pneumatic tire, more particularly to a tire noise damper used in a tire cavity.

DESCRIPTION OF RELATED ART

In recent years, as the mechanical noise from automobiles especially passenger cars is greatly reduced, pneumatic tires especially those for passenger cars are strongly required to reduce their noise. There are many factors, but a circumferential resonance of annular air in the tire cavity is one of major factors usually, a resonance peak occurs in a frequency range of from 50 to 400 Hz according to the tire size.

To reduce such a resonance noise, a noise damper made of a spongelike material which is disposed in the tire cavity so as to extend circumferentially of the tire has been proposed in the laid-open Japanese patent application JP-2002-67608-A.

If the noise damper gets wet during transporting, store keeping and the like, it takes a long time to get dry. Therefore, if a tire is mounted on a wheel rim together with the wet damper, there is a possibility that a not negligible amount of water is sealed in the tire cavity. As a result, a rotational imbalance is caused by the absorbed water and vibrations occur during high-speed running. In case of steering wheels in particular, the high-speed steering stability is greatly deteriorated. This phenomenon is very liable to occur when the volume of a damper is large, and the material can absorb water easily.

On the other hand, in case of the pneumatic tires used under very high speed conditions such as speed rating "W" or higher, adverse affect of the damper such as heat generation from the damper material, heat accumulation in the damper material, and insulation by the damper material of the thermal flow from the internal tread structure to the air in the tire cavity, becomes not negligible, and the possibility of thermal failure such as cord-rubber separation increases.

SUMMARY OF THE INVENTION

It is therefore, an object of the present invention to provide a pneumatic tire in which thermal failures under very high speed conditions can be effectively prevented.

In order to solve this problem, a pneumatic tire according to one aspect of the present invention comprises a plurality of small noise dampers each made of a spongelike multi-cellular material, wherein the total volume of the noise dampers is in a range of from 0.4 to 20% of a volume of the tire cavity, the noise dampers are disposed in the tire hollow and secured to an inner surface of a tread portion to extend in the circumferential direction of the tire at axially different positions.

Another object of the present invention is to provide a pneumatic tire, in which the occurrence of vibrations due to water absorption of the noise damper can be effectively prevented.

In order to solve this problem, a pneumatic tire according to another aspect of the present invention comprises a noise damper made of a spongelike multi-cellular material and provided with a water-impermeable outer coating to prevent water from infiltrating into the spongelike multi-cellular material.

Definitions

The volume V1 of the tire cavity is defined by the following approximation expression $$A \times \{(Di-Dr)/2+Dr\} \times pi$$

wherein

A is the cross sectional area of the tire cavity under a standard state,

Di is the maximum outer diameter of the tire cavity under the standard state as shown in FIG. 1, Dr is the diameter of the wheel rim, and pi is the ratio of the circumference of a circle to its diameter.

The above-mentioned "A" and "Di" can be easily obtained by CT scanning.

The standard state is that the tire is mounted on the wheel rim and inflated to a standard pressure but loaded with no tire load. The standard pressure is the "maximum air pressure" specified in JATMA, the "Inflation Pressure" in ETRTO, the maximum pressure given in the "Tire Load Limits at various Cold Inflation Pressures" table in T&RA or the like. In case of passenger car tires, however, 200 kPa is used as the standard pressure.

The volume of the noise damper means the apparent volume of the spongelike multi-cellular material inclusive of the total volume of the cells under the above-mentioned standard pressure.

DETAILED DESCRIPTION OF THE INVENTION

Figure 1:
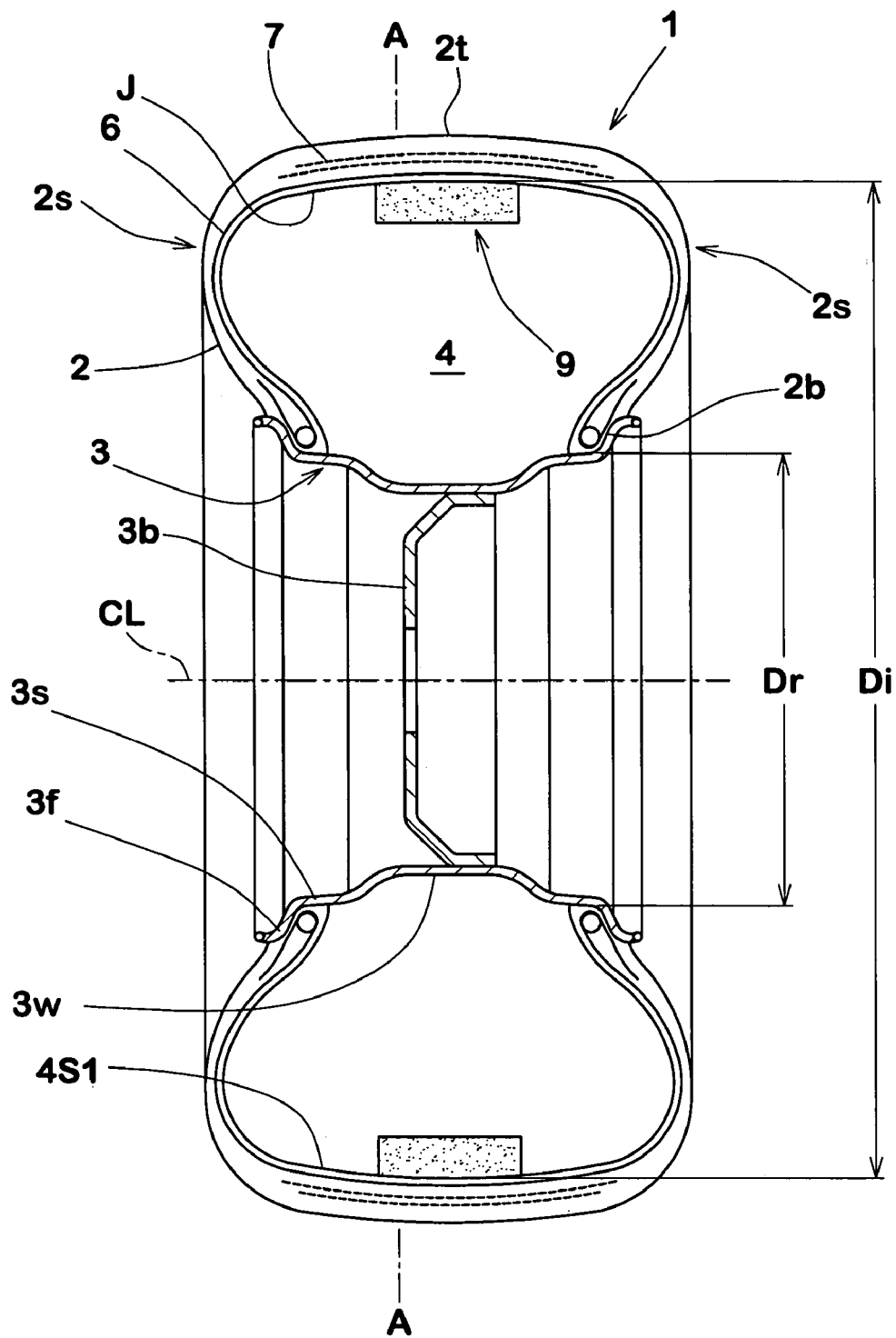
FIG. 1 is a cross sectional view of an assembly of a pneumatic tire, wheel rim and noise damper according to the present invention.

According to the present invention, a tire noise reducing system is made up of a pneumatic tire 2, a wheel rim 3 and at least one noise damper 9 as shown in FIG. 1.

The pneumatic tire 2 comprises: a tread portion 2t; a pair of axially spaced bead portions 2b each with a bead core therein; a pair of sidewall portions 2s extending between the tread edges and the bead portions 2b; a carcass 6 extending between the bead portions 2b; and a belt 7 disposed radially outside the carcass 6 in the tread portion 2t.

The wheel rim 3 comprises: a pair of bead seats 3s for tire beads 2b; a pair of flanges 3f extending radially outwardly from the bead seats 3s; and a rim well 3w between the bead seats 3s for tire mounting. In this example, the rim 3 is fixed to a centersection (spoke or disk) 3b attached to a vehicle's axle so as to form a two-piece wheel. Needless to say, the wheel rim 3 may be a one-piece wheel etc.

In the following embodiments, the tire is a radial tire for passenger cars.

The carcass 6 is composed of at least one ply of cords, for example a single ply 6A of radially arranged organic fiber cords.

The belt 7 comprises two cross breaker plies 7A and 7B for example each made of parallel steel cords inclined at an angle of from 10 to 30 degrees with respect to the tire equator C, and optionally a band (not shown). The band is disposed radially outside the breaker, and made of cords or windings of at least one cord laid at almost zero angle or a small angle with respect to the tire equator.

The tread portion 2t is provided with tread grooves C forming a tread pattern such as block pattern, rib pattern, rib-block pattern and the like.

Figure 2:
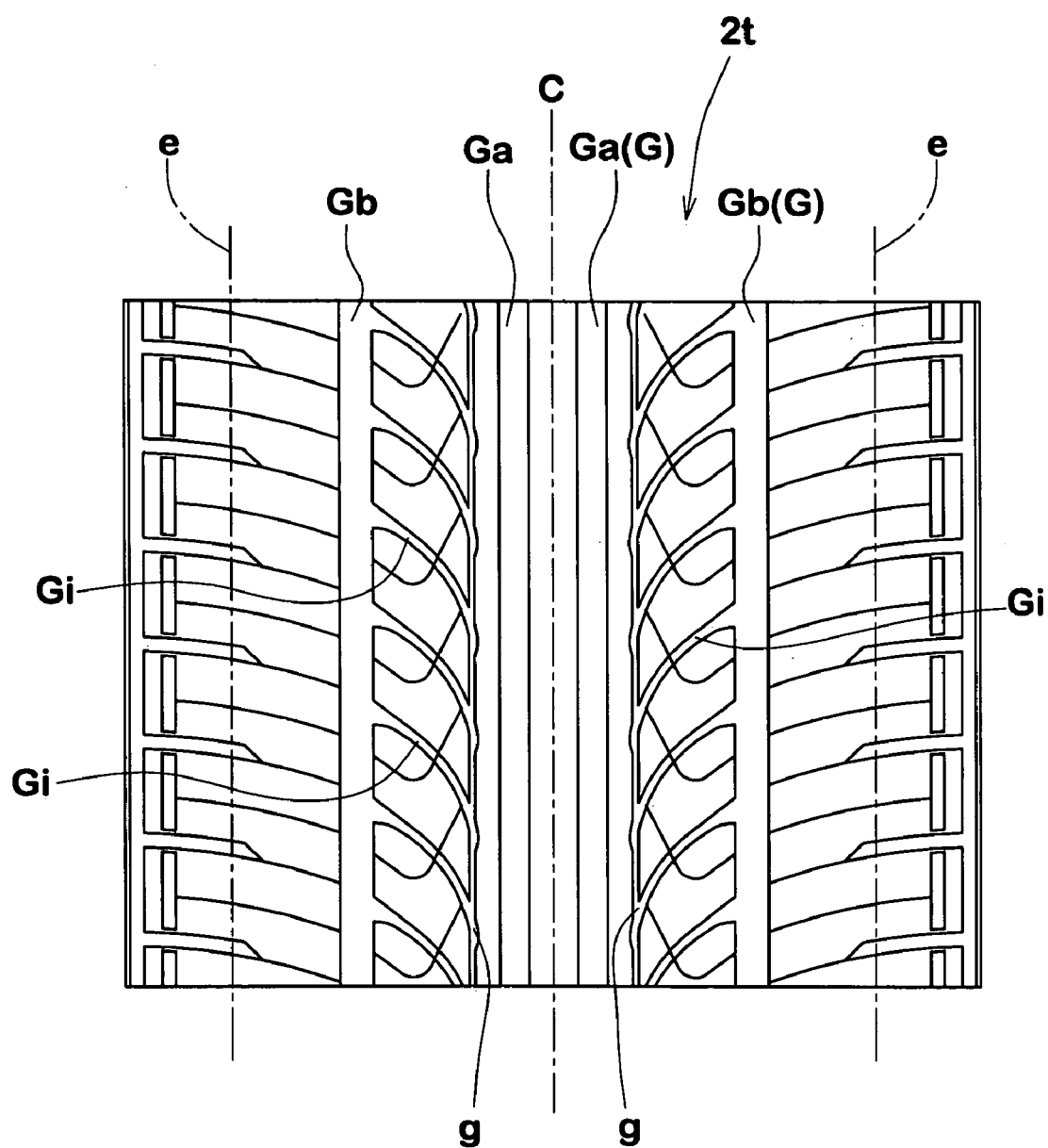
FIG. 2 shows an example of the tread pattern incorporated in the embodiments of the present invention.

FIG. 2 shows an example of such rib-block type tread pattern comprising: at least one main groove Ga, Gb extending circumferentially of the tire; and axial grooves Gi circumferentially dividing blocks.

In this particular example, the main grooves include an axially inner main groove Ga and an axially outer main groove Gb which are disposed on each side of the tire equator c and extend straightly continuously in the tire circumferential direction. Thus, the tread portion 2t is axially divided into five annular zones. The central zone on the tire equator C is formed as straight rib. The axially outer zones are circumferentially subdivided with axial sipes (namely, very narrow grooves or cuts). The middle zones are each provided with a circumferentially extending straight narrow groove (g) disposed close to the axially inner main groove Ga to form a narrow rib. From the narrow groove (g) to the outer main groove Gb, the above-mentioned axial grooves Gi extend to circumferentially divide this portion into blocks with respect to the axial positions, the main grooves Ga and Gb are symmetrical about the tire equator C. In this example, the tread pattern is a unidirectional pattern geometrically symmetrically about the tire equator C. Aside from the straight configuration, for example, the circumferential main groove may have a zigzag or wavy configuration.

In case of passenger car radial tires, the main grooves Ga and Gb each have a groove width Wg of not less than 6.0 mm, preferably more than 7.0 mm, more preferably more than 8.0 mm, and a groove depth D of not less than 4.0 mm, preferably more than 5.0 mm. For example, the width Wg is 10.0 mm, and the depth D is 11.0 mm.

The noise damper 9 is disposed in the tire cavity 4 and attached to the inner surface of the tread portion so as to circumferentially extend over the almost entire inner circumference.

The noise damper 9 is a strip 10 of a spongelike multi-cellular material of an open-cell type or a closed-cell or isolated-cell type optionally, the strip 10 is provided with a thin flexible outer coating 11 or surface layer impermeable to water to prevent water from infiltrating into the strip 10. This is especially preferable when the material of the strip is the undermentioned open type material and the volume is relatively large.

Here, the spongelike multi-cellular material means foamed plastic or resin, and foamed rubber, and further nonwoven fabric as well.

The nonwoven fabric can be made from fibers, such as synthetic fiber, animal fiber and plant fiber, which are loosely combined with each other by an appropriate means such as a binding agent, intertwist, and wrapping (namely, wrapping with the thin flexible outer coating 11).

As to the foamed rubber, so-called rubber sponge such as chloroprene rubber (CR) sponge, ethylene-propylene (EDPM) rubber sponge, and nitrile-butadiene rubber (NBR) sponge can be used.

In light of damping effect, durability, controllability of the expansion rate, and light weight nature, especially, preferably used is a foamed plastic or resin, e.g. so called synthetic resin sponge such as ether-based polyurethane sponge, ester-based polyurethane sponge and polyethylene (PE) sponge.

In the embodiments, an open-cell type polyurethane foam is used. The above-mentioned open type materials are the open-cell-type foamed plastic, resin and rubber, and further the unwoven fabric is included.

The specific gravity of the spongelike multi-cellular material is set in a range of more than 0.005, preferably more than 0.010, more preferably more than 0.01, but less than 0.06, preferably less than 0.03, more preferably less than 0.02. If the specific gravity is more than 0.06, it is difficult to control the air resonance of the tire cavity. If the specific gravity is less than 0.005, it is difficult to provide a necessary strength for the strip 10, and further it becomes difficult to control the air resonance of the tire cavity.

The total volume of all the dampers 9 or the volume of the single noise damper 9 in the tire cavity 4 is set in a range of more than 0.4%, preferably more than 1%, more preferably more than 2%, still more preferably more than 4%, but less than 20%, preferably less than 15%, more preferably less than 10% of the volume of the tire cavity 4. As a result, it becomes possible to reduce the noise about 2 dB or more. If the total volume is increased over 20%, the noise can not be reduced any more in spite of drawbacks, e.g. weight increase, cost increase, tendency to weight imbalance and the like.

The damper 9 has a substantially constant cross-sectional shape along the length thereof excepting the circumferential ends thereof. The axial width is constant along the entire length. The thickness in the tire radial direction is also constant in the almost entire portion, excepting the circumferential ends.

As to the cross-sectional shape, rectangles are preferably used, but shapes having a base width larger than a top width such as trapezoids and triangles may be preferably used as well.

The length of the strip 10 is the same as or slightly shorter than the inner circumference of the tire.

Figure 5A:
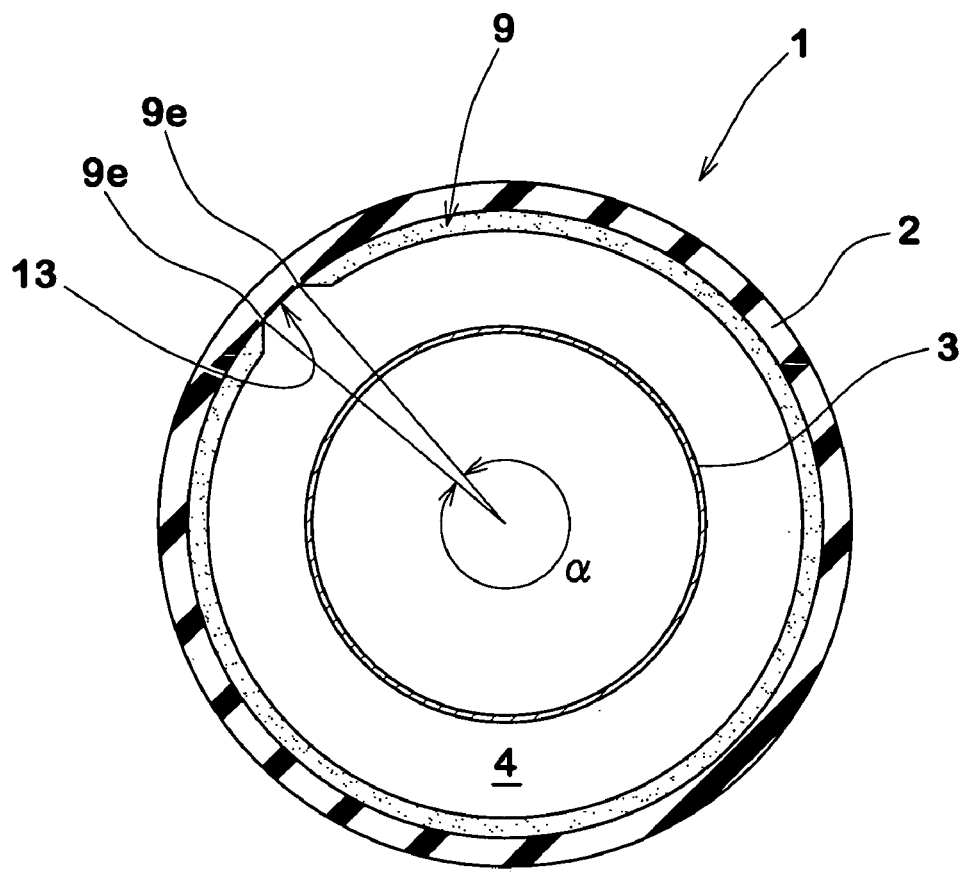
FIG. 5(a) is a schematic cross sectional view of the single noise damper taken along line A—A in FIG. 1.

If the length is as shown in FIG. 5(a), expressed by the angle alpha around the tire rotational axis, it is preferable that the angle alpha is in the range of from 300 to 360 degrees, more preferably 350 to 359 degrees.

Figure 3:
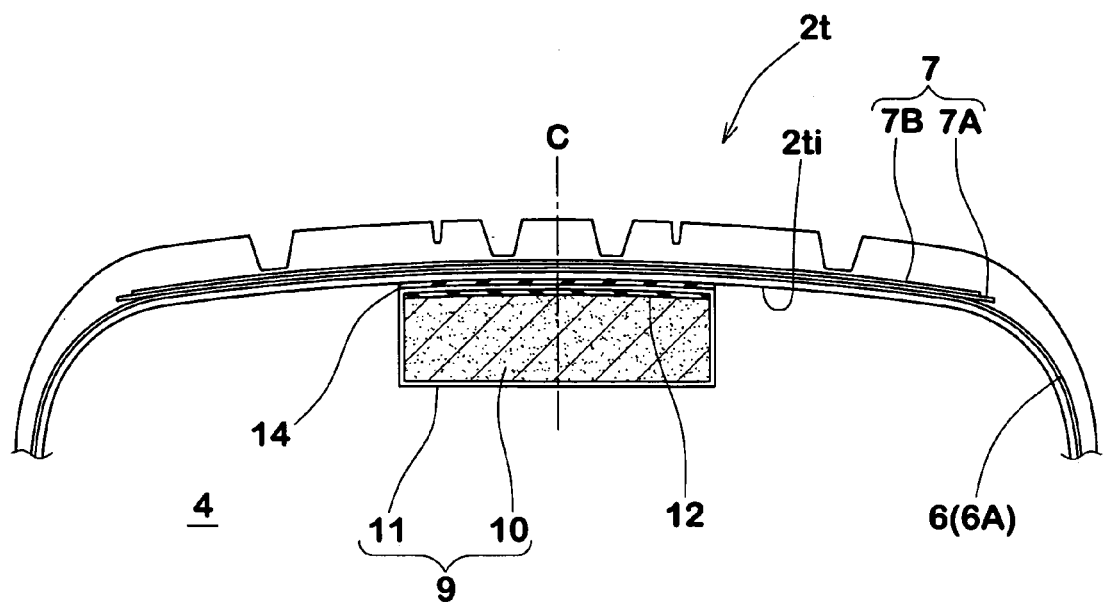
FIG. 3 is a cross sectional view showing an embodiment of the present invention, wherein a single noise damper which is provided with a water-impermeable outer coating is disposed so as to cover a plurality of circumferential grooves.

In case of tire size 195/65R15 for passenger cars, for example, the strip length is 1850 mm, and in the FIG. 3 example, a 1850×70×30 mm strip 10 having a rectangular shape being long in the axial direction is used.

When a shorter damper 9 is used, as a discontinuous part 13 is formed between the ends 9e, it is necessary to determine the position of the discontinuous part 13 so as to minimize the resultant weight imbalance of the tire in order to prevent deterioration of tire uniformity such as RRO, RFV and conicity.

Figure 6A:
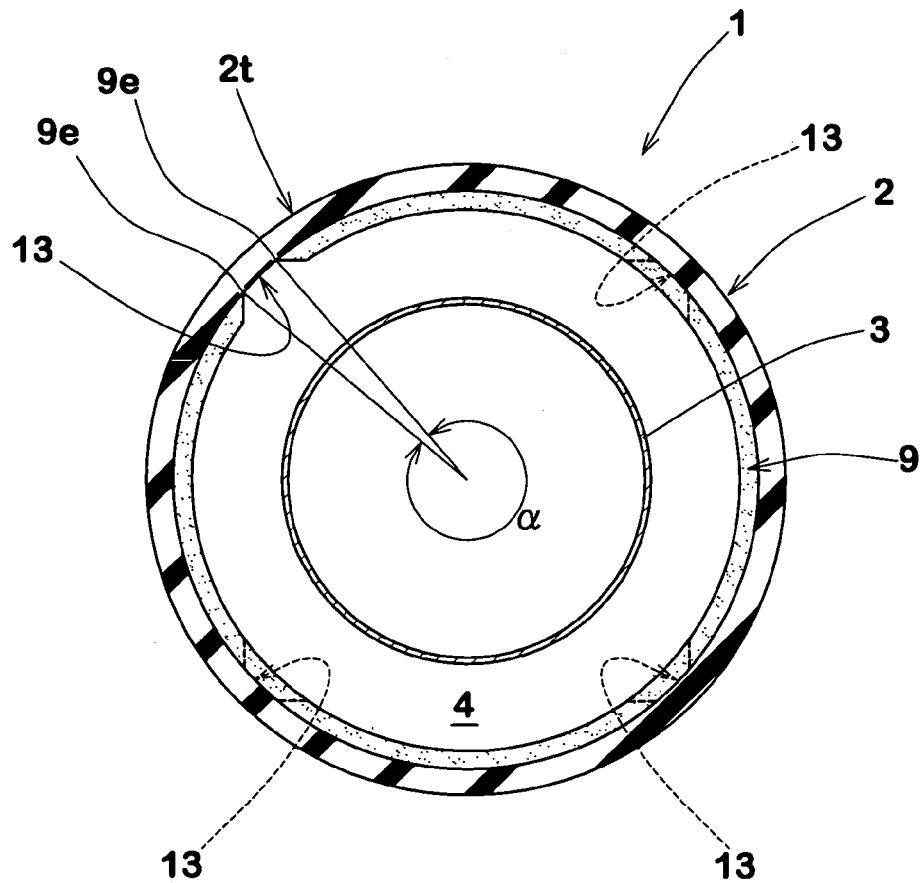
FIG. 6(a) is a schematic cross sectional view similar to FIG. 5(a) and FIG. 6(b) is a diagram, both for explaining the locations of the discontinuous parts of a plurality of noise dampers.
Figure 6B:
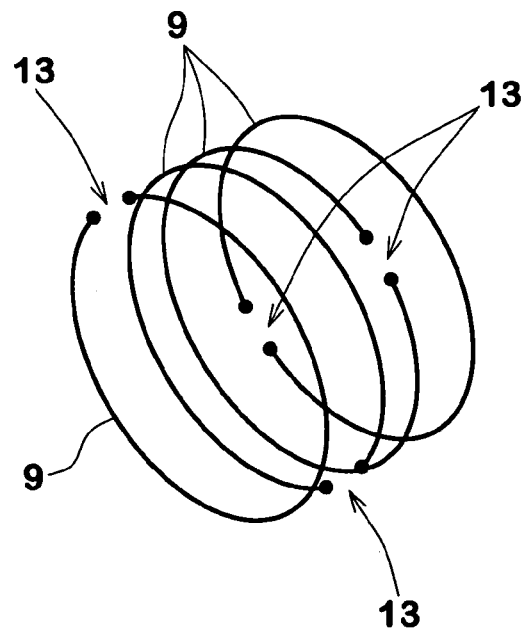

In case of a plurality of discontinuous parts 13, usually, it may be effectual to arrange the discontinuous parts 13 equiangularly around the tire axis. For example, in case of four discontinuous parts 13, as shown in FIGS. 6(a) and 6(b), the discontinuous parts 13 are disposed every 90 degrees. In the example of FIG. 6(b), a pair of the adjacent strips on each side of the tire equator are arranged such that their two discontinuous parts 13 are disposed at 180 degree opposed positions. But, viewed two pairs as a whole, the discontinuous parts 13 are disposed every 90 degrees.

Of course, these specific arrangements which are effectual for improving the tire uniformity assume that all the discontinuous parts 13 have substantially identical negative weight. In other words, the volume of every discontinuous part 13, namely, that of the missing part from the perfect annular body is the same value. In the illustrated examples, the discontinuous parts are the substantially same length.

Figure 5B:
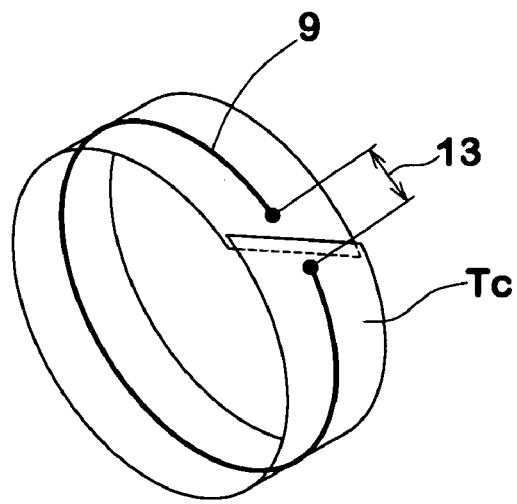
FIG. 5(b) is a diagram for explaining the location of the discontinuous part of the single noise damper.

In case of a single discontinuous part 13 in particular, it may be possible to utilize a negative weight of the discontinuous part 13 to compensate a positive imbalanced weight which could be produced by an overlap of the jointed ends of a tire component Tc such as breaker ply, carcass ply and the like. More specifically, as shown in FIG. 5(b), by aligning a discontinuous part 13 with such a joint part, it may possible to improve the imbalance. This method can be applied to a plural-discontinuous-part case as well.

Figure 9A:
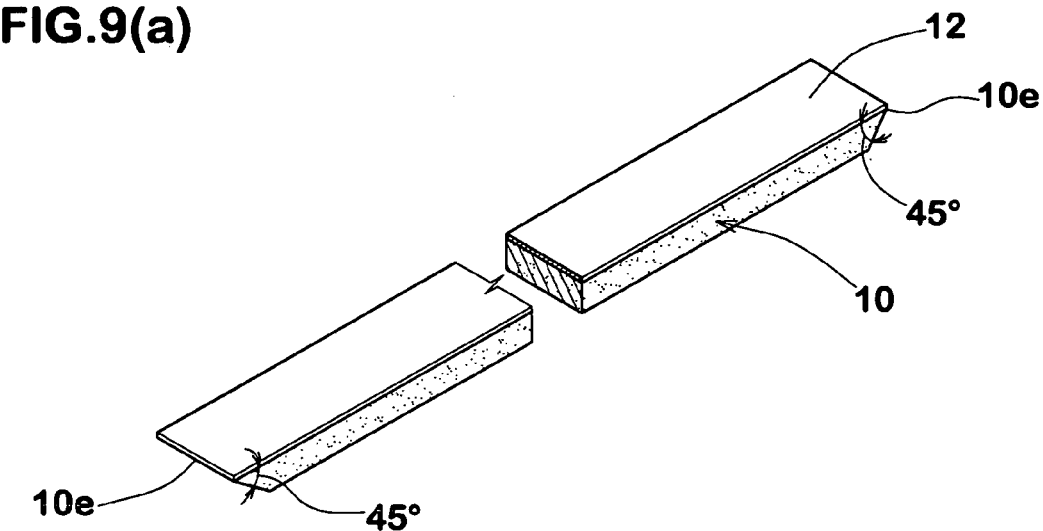
FIGS. 9(a)–9(c), 10(a)–10(c) are perspective views showing a method of making a noise damper with a water-impermeable outer coating.

Again in case of a shorter damper 9, to prevent separation during use, the circumferential ends are tapered as shown FIGS. 5(a), 9(a) and others so as to gradually decrease its radial height from the tire inner surface 4S1. However, it is also possible to taper one end reversely to the other to splice the ends.

As descried above, the noise damper 9 is fixed to the inner surface 4S1 of the tread portion 2t by means of a double-sided adhesive tape 14, adhesive agent or the like in advance of tire mounting.

During transporting, store keeping and the like, if the noise damper 9 gets wet, it takes a long time to get dry. Therefore, there is possibility that a not negligible amount of water is sealed in the tire cavity 4 when the tire is mounted on a wheel rim 3.

Figure 8:
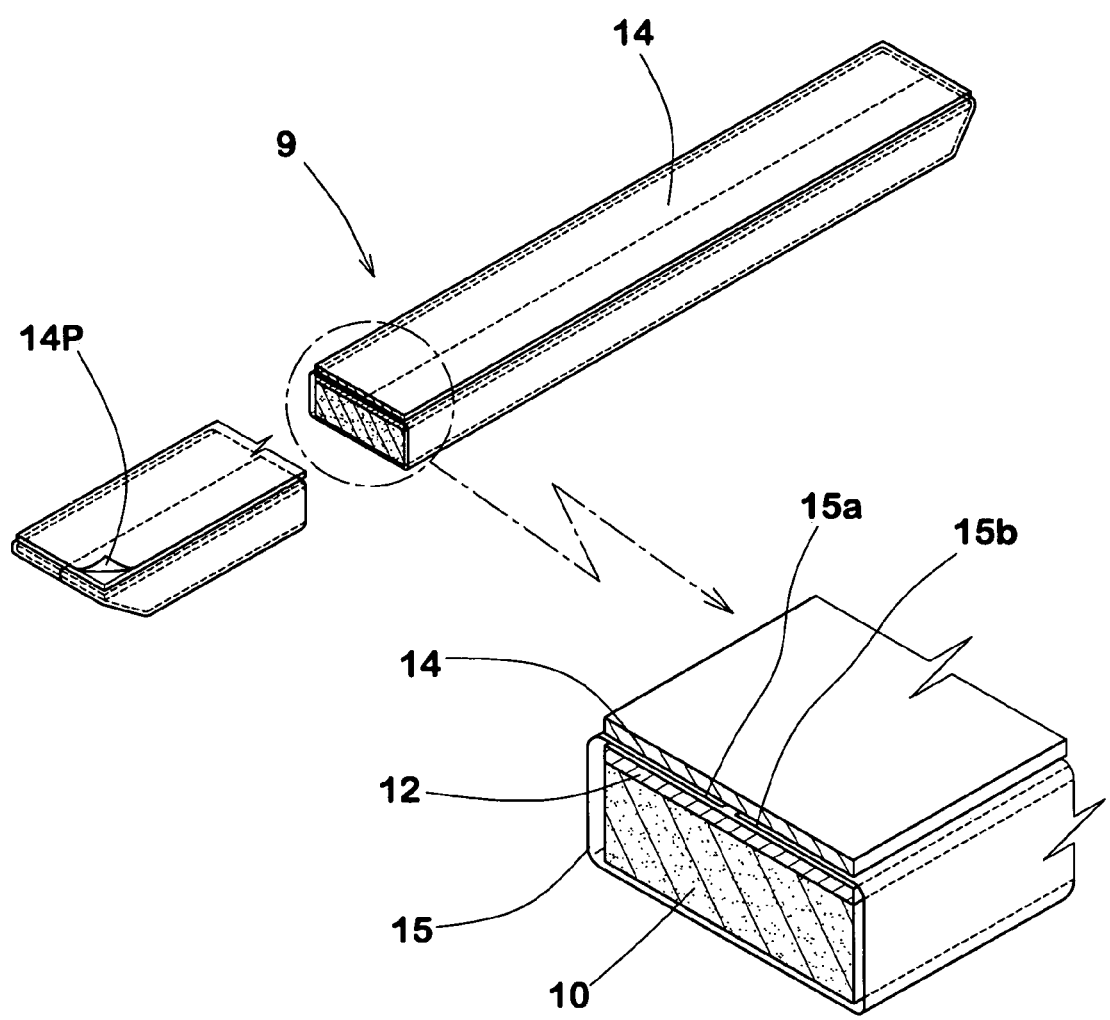
FIG. 8 is a perspective view showing a noise damper according to the present invention.

Therefore, in order to prevent water from infiltrating into the strip 10, it is preferred that the strip 10 is completely covered with a thin flexible outer coating 11 impermeable to water as shown in FIG. 3 and FIG. 8. This is especially preferred when the material of the strip is an open type material and the volume is relatively large.

The outer coating 11 is a separate film 15 completely wrapping the strip 10 therein.

As to the material of the film 15, various materials may be used as far as it is flexible and impermeable to water. For instance, resin or plastic films such polyethylene, polyvinylidene chloride, polypropylene, nylon and the like are preferably used.

In order to effectively derive a damping effect from the strip 10 of the spongelike multi-cellular material, it is important to provide transparency to sound. Thus, the thickness of the resin film 15 is made as thin as possible as far as the necessary strength can be provided. For example, the thickness is set in a range of from 0.01 to 0.10 mm. The resin film used in the embodiments is made of a single material, in other words, it has a single layered structure, but, a laminated film having a double or more layered structure of different materials as well as the same material can be used to improve for example the strength, impermeability, adhesion and the like.

It is preferred that the film 15 is not adhered to the strip's surface which is exposed to sound wave of condensation and rarefaction in the tire cavity. This is because the film can be moved following the condensation and rarefaction. If the film is moved easier, it may be said the transparency to sound is higher, and the film may be ignored in considering the damping effect. However, if the film is adhered to the strip's surface, as the movement following the condensation and rarefaction is restricted, reflection of sound waves increases and irregular reflection decreases. Thus, there is a tendency for the noise damper to decrease its damping effect. As the air sealed in the outer coating 11 decreases its volume with the tire inflation, there is a possibility that the sheet is appressed to the strip's surface. Therefore, it will be preferable that the strip 10 is slightly loosely enwrapped in the sheet or if possible the inside of the outer coating 11 is slightly inflated.

In the embodiments, the noise damper 9 is fixed to the inner surface 4S1 of the tread portion 2t by the use of a double-sided adhesive tape 14.

Figure 7A:
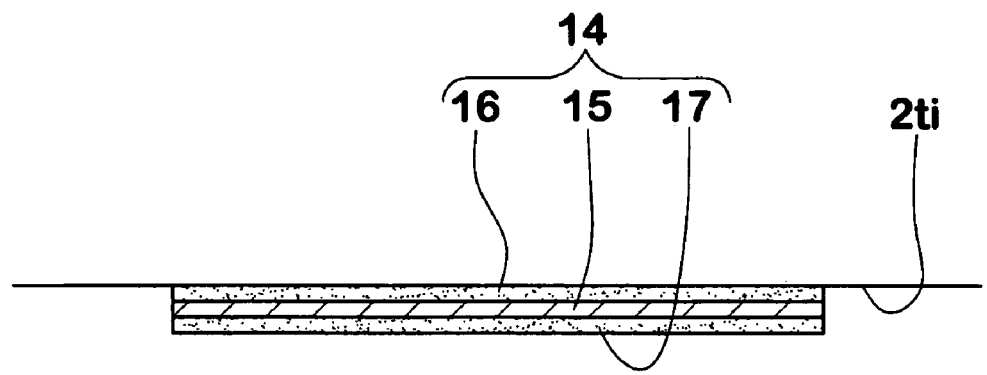
FIGS. 7(a) and 7(b) are enlarged cross sectional views each showing a double-sided adhesive tape.
Figure 7B:
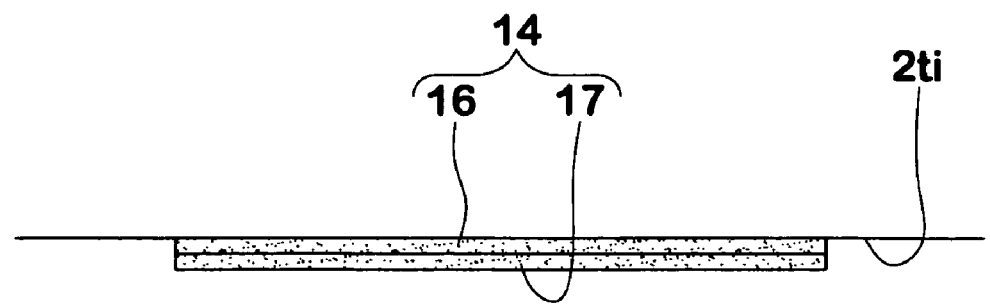

As to the double-sided adhesive tape 14, (1) a tape, as shown in FIG. 7(a), having a base tape 15 with a coat of an adhesive material 16 on one side and a coat of an adhesive material 17 on the other side, (2) a tape, as shown in FIG. 7(b), having no base tape and made up of only a layer of an adhesive material 16 and a layer of an adhesive material 17, and (3) a tape made up of only a single layer of an adhesive material 16, 17 (not shown) can be used.

The base tape 15 is, for example: plastic film such as polyester; sheet of plastic foam such as acrylic foam; nonwoven fabric or bonded material; a woven textile; and the like.

As to the adhesive materials 16 and 17, for example, (1) rubber adhesive comprising natural rubber and/or synthetic rubber, tackifier, softener, age resistor and other additives, (2) acrylic pressure sensitive adhesive made by copolymerizing acrylic esters having different glass-transition temperatures and difefrent kinds of monomers, (3) silicone pressure sensitive adhesive made from silicone rubber, resin, etc., (4) polyether adhesive, (5) polyurethane adhesive and the like can be used.

As to the adhesive materials 16 and 17, it is possible to use the same adhesive material, but, it is desirable to use different types of adhesive materials, for example, a rubber adhesive which adheres strongly to the tire rubber, and an acrylic pressure sensitive adhesive which adheres strongly to the noise damper 9.

Aside from the solo use of such double-sided adhesive tape, it is also possible to use an adhesive agent alone or in combination with the double-sided adhesive tape.

As for the adhesive agent, for example, synthetic rubber latex adhesive, and rubber adhesive based on synthetic rubber dissolved in organic solvent are preferably used. Especially, from the aspect of flexibility and adhesion force, chloroprene rubber dissolved in organic solvent is preferred.

In this case, preferably, cyclohexane (alicyclic solvent), acetone (ketone) and hexane (aliphatic solvent) are used as the organic solvent, alone or in combination, and the content of the chloroprene rubber is set in the range of from 25 to 35 weight % with respect to the overall weight of the adhesive agent. If less than 25 weight %, the adhesion strength becomes insufficient. If more than 35 weight %, the adhesion strength has a tendency to decrease due to difficulty in application and spread.

The noise damper 9 is fixed at a certain axial position to extend continuously in the tire circumferential direction.

In the example shown in FIG. 3, a single noise damper 9 made of a relatively wide strip 10 is centered on the tire equator c and extends along the tire equator C. In this example, the above-mentioned outer coating 11 is provided.

Figure 4:
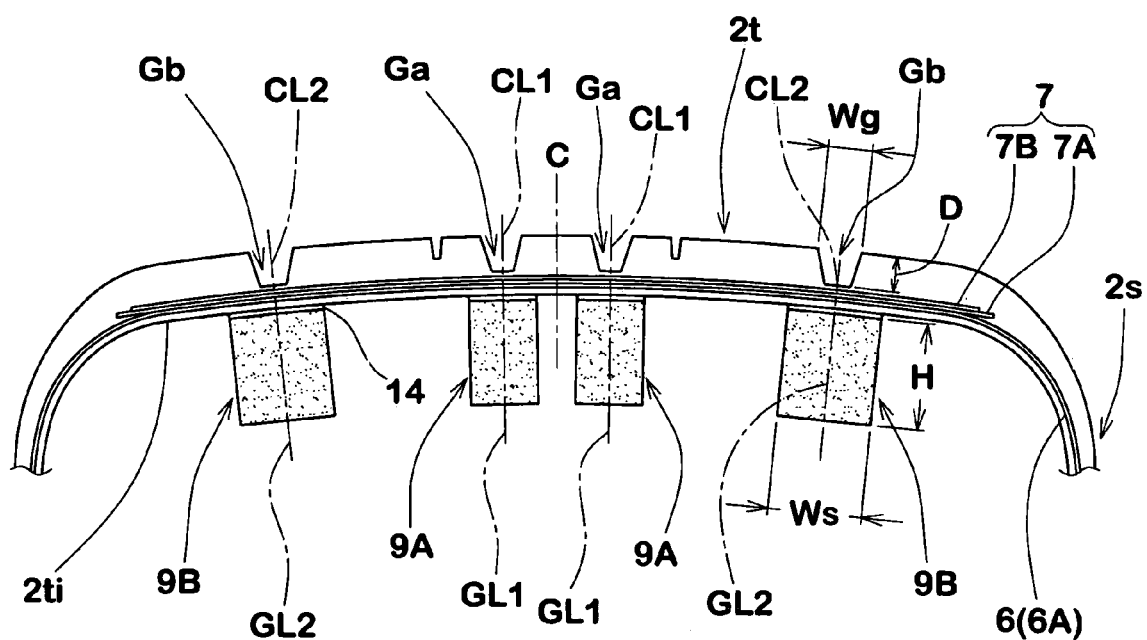
FIG. 4 is a cross sectional view showing another embodiment of the present invention, wherein a plurality of noise dampers are provided at different axial positions corresponding to a plurality of circumferential grooves.

In the example shown in FIG. 4, a plurality of noise dampers 9 each made of a relatively narrow strip 10 are disposed at different axial positions to extend parallel with the tire equator C. In this example, the outer coating 11 is not provided, but it is of course possible that at least one of the dampers is provide with the coating 11.

By dividing a large noise damper into a plurality of small noise dampers, heat release is promoted and heat accumulation is lessened. Further, if the noise damper 9 gets wet, the time to get dry becomes shorter, which may decrease the need for the outer coating 11.

As the dividing into a plurality of small noise dampers 9 can increase the high-speed durability, such structure can be preferably employed in high speed tires.

In FIG. 4, four dampers 9: a pair of axially inner dampers 9A of the same size and a pair of axially outer dampers 9B of the same size but wider than the inner damper 9A, are arranged line symmetrical about the tire equator C.

In case of a plurality of dampers, the dampers are arranged line symmetrical about the tire equator c with respect to the axial locations of their centers GL1 and GL2 in the widthwise direction of the dampers. Further, in the tire meridian section, the cross-sectional shapes of the dampers are made mirror symmetrical about the tire equatorial plane. These are usually preferable but not essential. For example, if the dampers have different sizes, there is a possibility that an asymmetrical arrangement is preferable to a symmetrical arrangement.

At the position of the main groove Ga, Gb, as the overall thickness of the tread portion 2t is decreased, the heat generation is less, and the heat radiation from the inside of the tire becomes larger. Therefore, by applying the damper immediately inside the wide main groove, the heat generated in the damper during high speed running may be released through the thin groove bottom, and the deterioration of the high-speed durability may be lessened.

On the other hand, the rigidity is smaller in the groove bottom as the overall thickness is small. Therefore, during running, this portion is liable to vibrate the air in the tire cavity 4. By applying the damper immediately inside the groove bottom, the occurrence of vibration as well as radiation of vibrations into the tire cavity may be decreased to improve the noise.

In this light, it is preferable that a damper exists at the center of the width of the main groove, irrespective of whether the damper covers the entire groove width or not.

In FIG. 3, therefore, the single wide damper 9 is applied so as to extend axially to cover the widths of a plurality of circumferential wide main grooves Ga and circumferential narrow grooves (g) which are provided in the tread crown portion. And no damper is disposed in the tread shoulder portions where the heat generation is more.

In FIG. 4, however, narrow dampers 9 are applied such that each damper extends axially to cover the width of one circumferential main groove Ga, Gb. The center of the damper 9 in the widthwise direction is substantially aligned with the center of the main groove Ga, Gb. In this case, the width Ws of a damper is preferably in the range of more less than 1.0 times, more preferably more than 1.5 times, but less than 4.0 times, more preferably less than 3.0 times the width Wg of the main groove Ga, Gb. The height H of the damper is preferably set in the range of from 30 to 160%, more preferably 50 to 120% of the width ws.

In any case, it is important to arrange the noise dampers 9 in a weight distribution pattern not to deteriorate the tire conicity. The simple way to achieve this is the use of the above-mentioned mirror symmetrical cross-sectional shapes and line symmetrical arrangement.

In order to improve the adhesive strength, a primer is preferably applied to the bonding surface before applying the adhesive agent and/or tape. For example, a primer containing a synthetic rubber as its main component in a-solvent such as toluene, methyl ethyl ketone (MEK) and dimethylformamide (DMF) is preferably used for the bonding surface 4S1 of the tire 2. For the bonding surface of the strip 10, a primer containing a synthetic rubber as its main component in a solvent such as toluene, methyl ethyl ketone (MEK) and acetic ether is preferably used.

When the inner surface of the tire is covered with a mold-releasing agent such as silicone oil which greatly decreases the adhesive strength, the mold-releasing agent should be removed chemically by the use of an organic solvent or physically by grinding or the like. In the embodiments, therefore, to avoid such removing work, a bladder covered with a non-adhesive release coat such as fluorocarbon resin coat is used in vulcanizing the tire in a mold.

On the other hand, conventionally, a bladder is provided with air vent grooves so that the air between the bladder and tire is removed therethrough during inflating the bladder. Therefore, on the inner surface of the vulcanized tire, small ribs corresponding to the vent grooves are formed. If such ribs decrease the adhesive strength, it should be removed before applying the adhesive agent or tape. In the embodiments, therefore, to avoid such rib-removing work, instead of the conventional bladder, a bladder provided with a smooth surface in an circumferentially extending annular zone which corresponds to the bonding surface of the tire is used.

FIG. 9(a) shows a strip 10 of a spongelike multi-cellular material. The strip 10 is cut into the above-mentioned predetermined length and both ends are tapered at for example 45 degrees. A double-sided adhesive tape 12 is applied to one side (becoming the radially outside when assembled in the tire). The width of the double-sided adhesive tape 12 is substantially equal to the base width of the strip 10.

In case without the outer coating 11, this is applied to the tire inner surface as the noise damper 9.

Figure 9B:
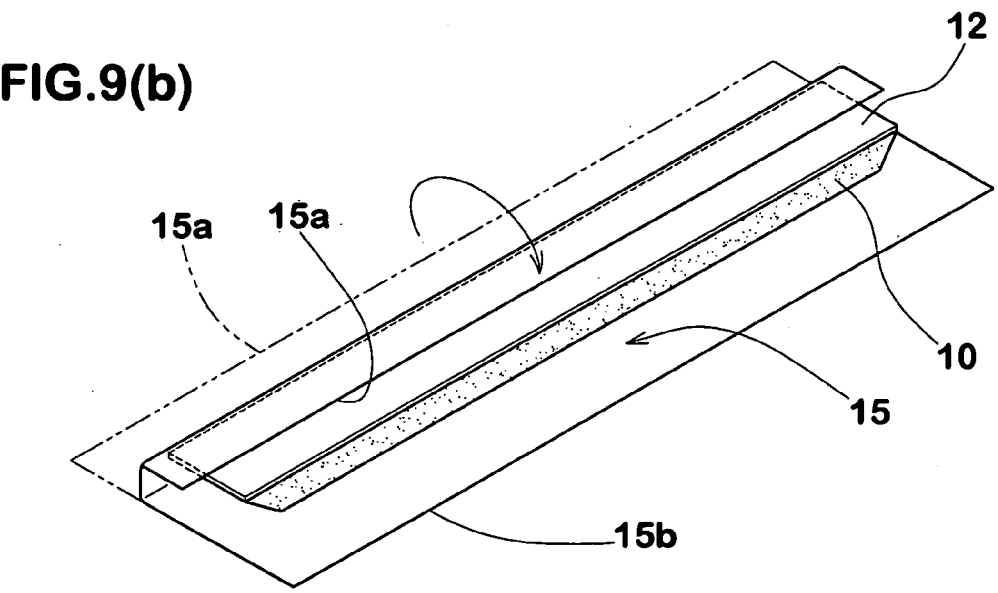
Figure 9C:
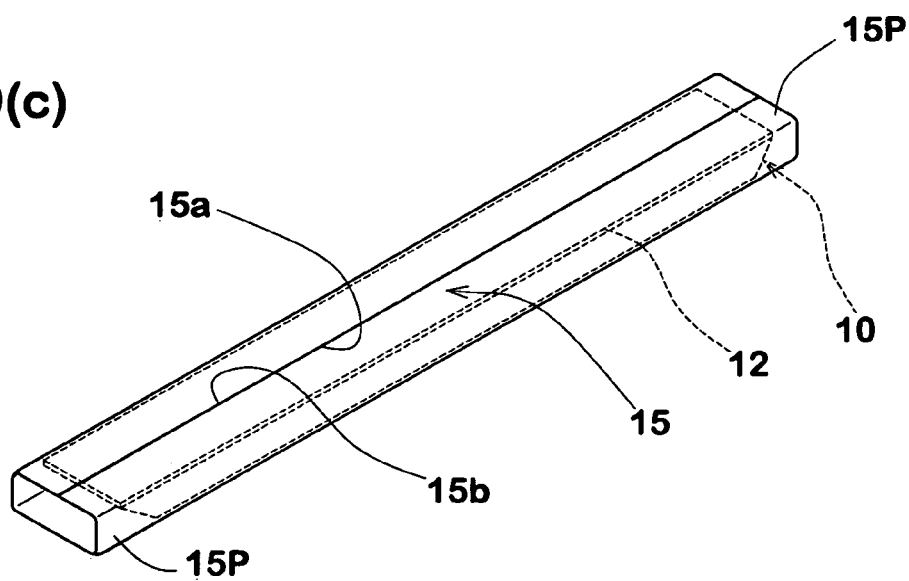

In case of the damper 9 with the outer coating 11, the outer coating 11 is formed through the following steps in FIGS. 9(b)–9(c). In this example, the double-sided adhesive tape 12 is also applied to the tapered ends 10e of the strip 10 continuously. As show in FIGS. 9(b) and 9(c), a resin film 15 is wrapped around the strip 10, and the edge portions are adhered to the tape 12 with the edges 15a and edge 15b aligned the center line of the tape 12. At this point, the resin film 15 is shaped like a tube whose both ends are opened. Thus, the next step is to close the open ends.

As the resin film 15 is made longer than the strip 10, both ends of the resin film 15 protrude from the ends of the strip 10. Thus, both ends are closed by folding each of the protruding portions 15P.

Figure 10A:
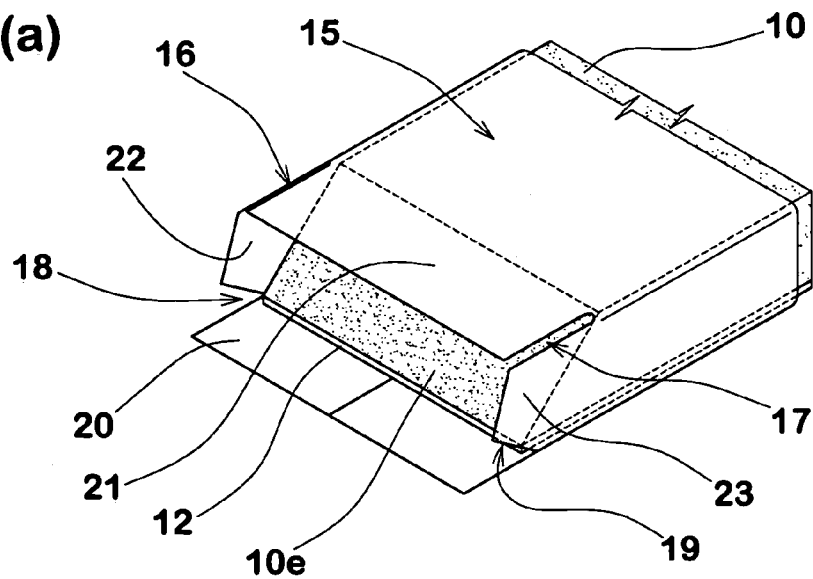
Figure 10B:
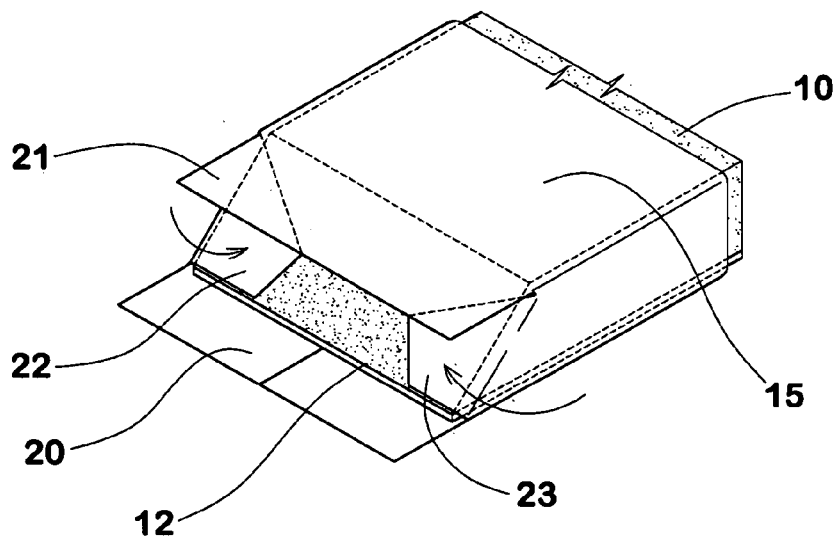
Figure 10C:
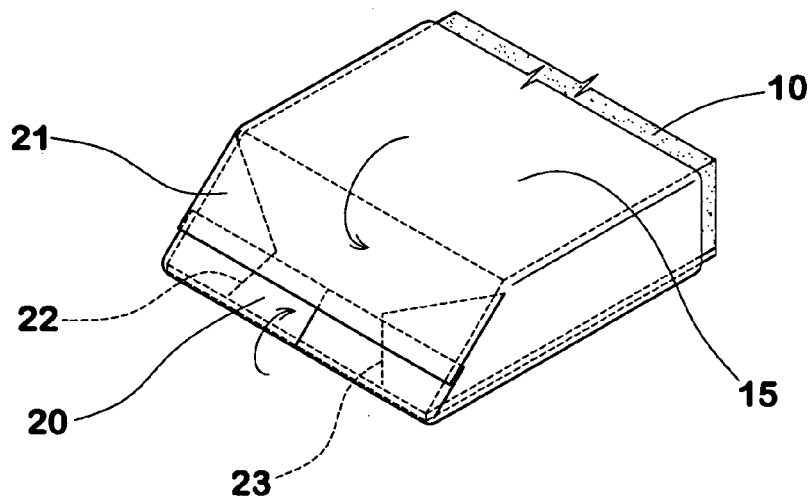
Figure 11A:
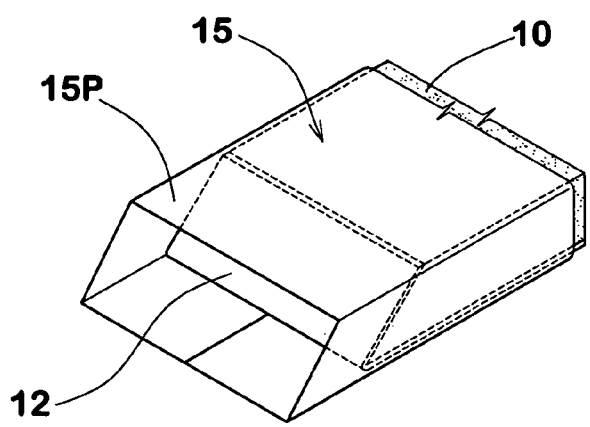
FIGS. 11(a)–11(d) are perspective views showing another example of folding the protruding end of the wrapping film.
Figure 11B:
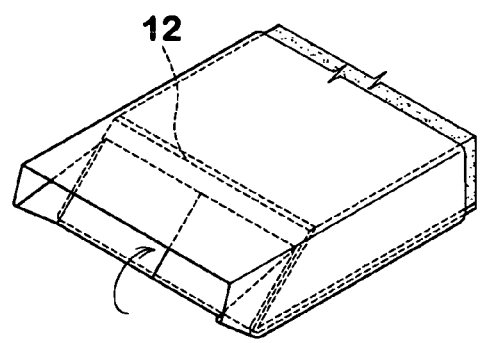
Figure 11C:
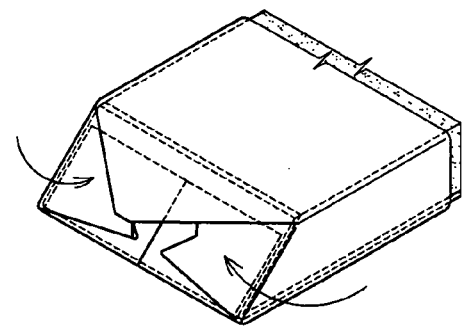
Figure 11D:
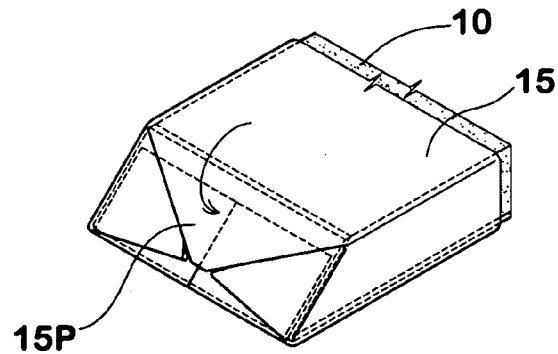

FIGS. 10(a)–10(c) show an example of folding of the protruding portion 15P. In this example, cuts 16 and 17 and notches 18 and 19 are provided at the positions corresponding to the four corners of the strip, and the divided pieces 20, 21, 22 and 23 are folded and then secured and sealed by an adhesive tape and/or adhesive agent.

FIGS. 11(a)–11(d) show another example wherein the protruding portion 15P is simply folded without making the above-mentioned cuts and notches, and the folded portion 15 P is secured and sealed by an adhesive tape and/or adhesive agent.

Further, as shown in FIG. 8, a double-sided adhesive tape 14 with a released paper 14p is applied to the damper 9 wrapped with the resin film 15 such that the tape 14 completely overlaps the tape 12 so that the edges 15a and 15b of the resin film 15 are sandwiched between the double-sided adhesive tapes 12 and 14.

Figure 12:
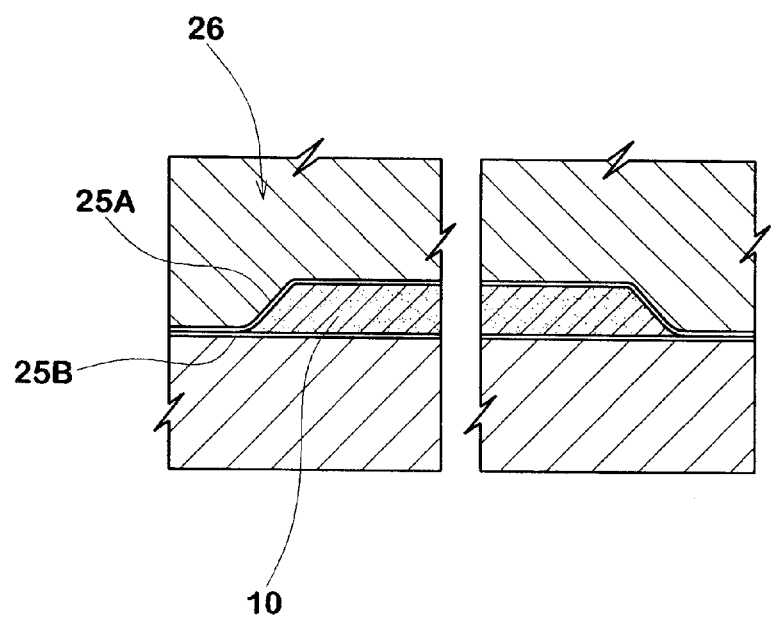
FIG. 12 is a cross sectional view for explaining another method of making a noise damper with a water-impermeable outer coating.

FIG. 12 shows another method of making the noise damper 9 with the outer coating 11. In this example, the strip 10 is sandwiched between two resin sheets 25A and 25B, and put into a mold 26 to fusion bond the marginal portion of the overlapping sheets. In this case, it is preferable that the surface of the strip 10 on the tire side and the sheet 25B on the tire side are fusion bonded while the remaining surface and the sheet 25A are not bonded for the transparency to sound as explained above.

In the above-explained embodiments, the noise damper 9 with the outer coating 11 is fixed to an inner surface of a pneumatic tire. But this type of damper can be fixed to an inner surface of a wheel rim facing the tire cavity, for example within the rim well 3w. In this case too, a remarkable noise damping effect may be obtained.

Comparison Tests

Test tires having the same structure except for the damper structure were prepared and tested for the noise performance and high-speed durability.

Figure 14:
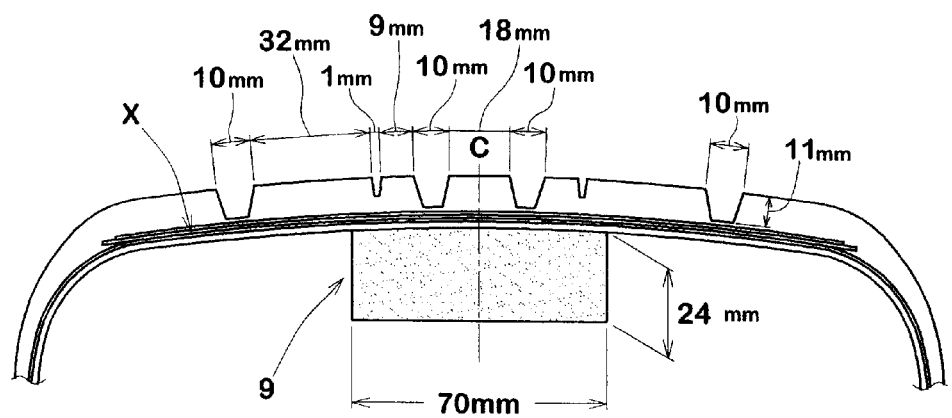

The tire was a radial tire of size 235/45ZR17 93 w for passenger cars having the tread pattern shown in FIG. 2. The groove widths and arrangements are shown in FIG. 14. The size of the wheel rims used was 17×7 J. In vulcanizing the tire, a bladder with a smooth surface was used to provide a smooth bonding surface. The volume of the tire cavity was 26154 cc.

The noise damper was made from ether based polyurethane sponge (MARUSUZU K.K., Product code E16) having a specific gravity of 0.0016. The thickness and length of the strip were constant values of 24 mm and 1900 mm, respectively, but the width was changed as show in FIGS. 14–19. The length of 1900 mm corresponds to the angle alpha of 350 degrees. The ends were tapered at 45 degrees. The damper was secured to the tire with a double-sided adhesive tape (Nitto Denko Corp. Product code 5000NS).

Noise Test:

A Japanese 3000 cc FR passenger car provided on all the four wheels with test tires (tire pressure 200 kPa) was run on a noise test course with a rough asphalt paved surface, and during running at a speed of 60 km/hr, noise sound was measured in the inside of the car. The measuring position was near the driver's ear on the outside or window side of the car. Measured was the sound pressure level of a peak occurring at a frequency near 240 Hz—this frequency corresponds to that of the primary resonance mode of the ring of air of the tire cavity. The results are indicated in Table 1 in dB based on Ref. 1 being zero dB.

High-Speed Durability Test:

According to ECE-30 (Procedure for Load/speed Performance Tests of the Economic commission for Europe), the tire-rim assembly was subjected to an indoor test using a test drum, wherein the running speed was gradually increased, and the speed at which any failure occurred was measured together with the running time at that speed. The test results are shown in Table 1. The position at which the failure (cord loose) was occurred was marked as "X" in FIGS. 13–19.

TABLE 1

Figure 13:
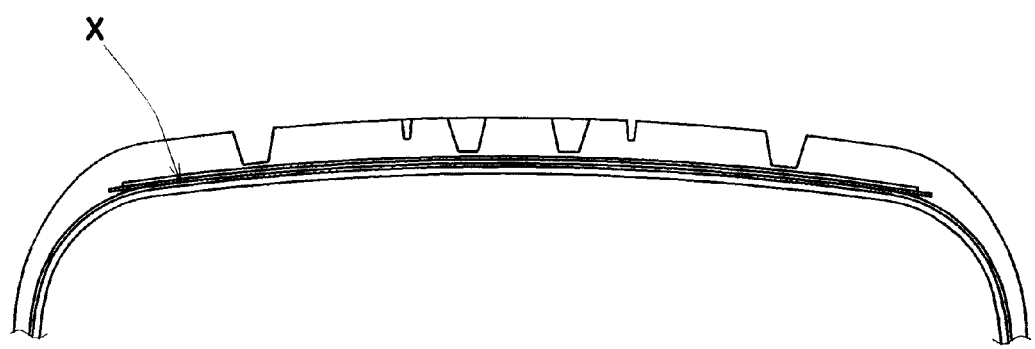
FIGS. 13–19 are cross sectional partial views of test tires used in the undermentioned comparison tests.
Figure 15:
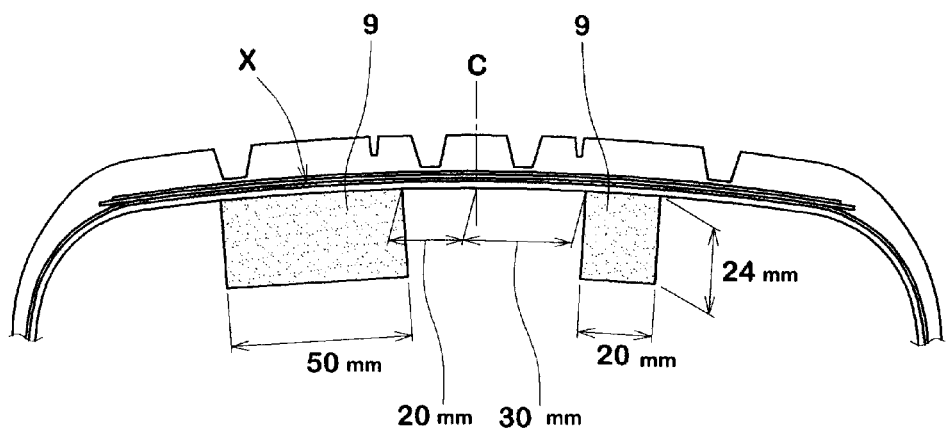
Figure 16:
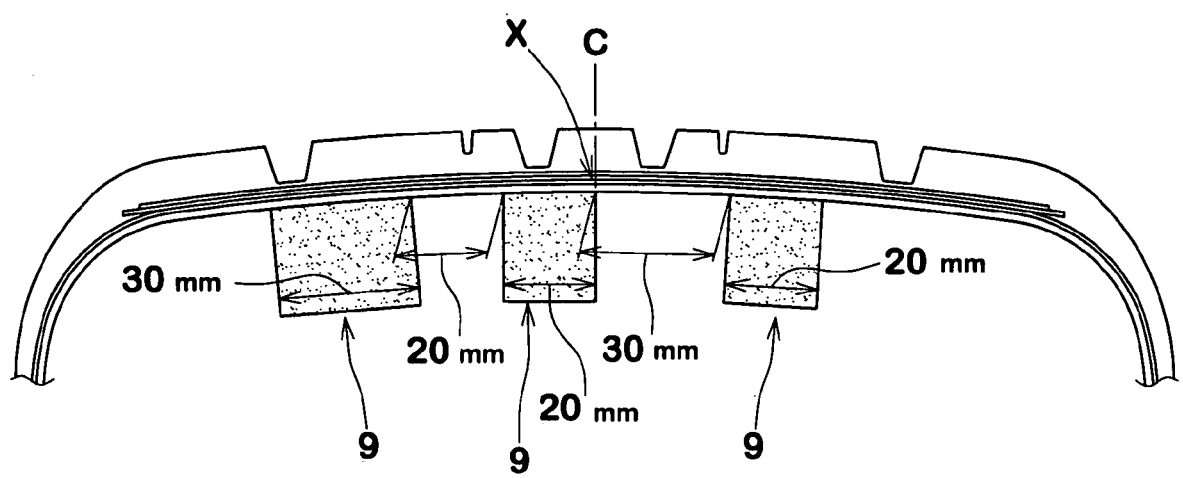
Figure 17:
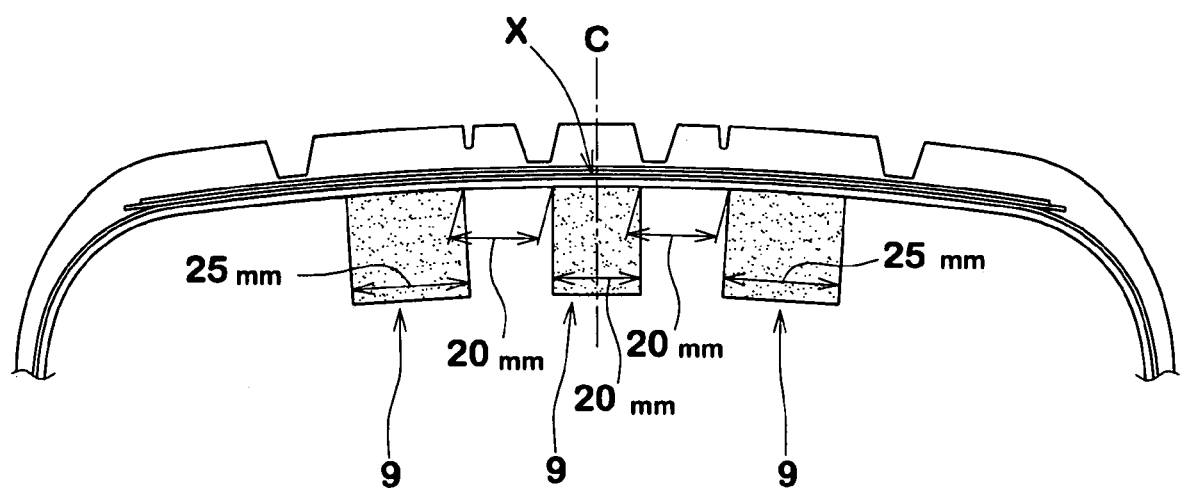
Figure 18:
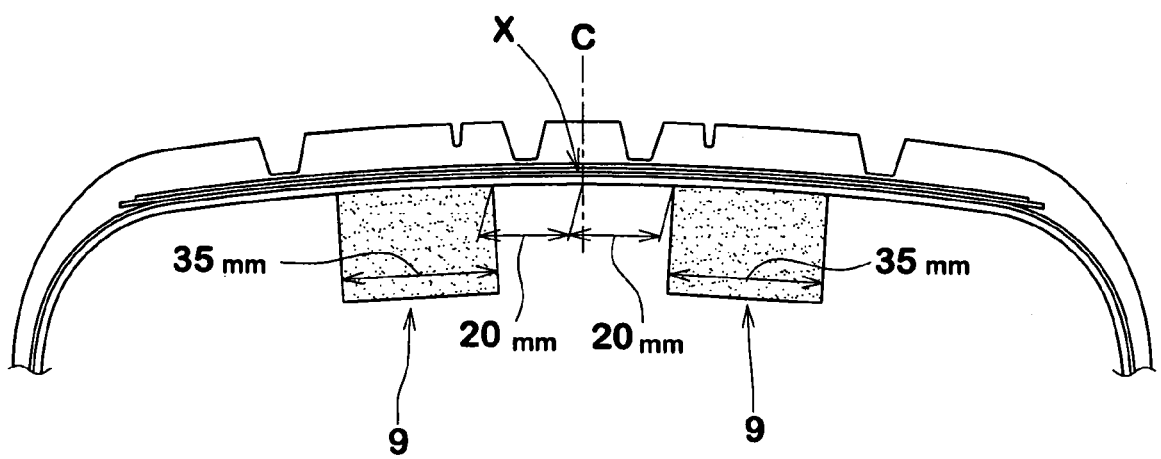
Figure 19:
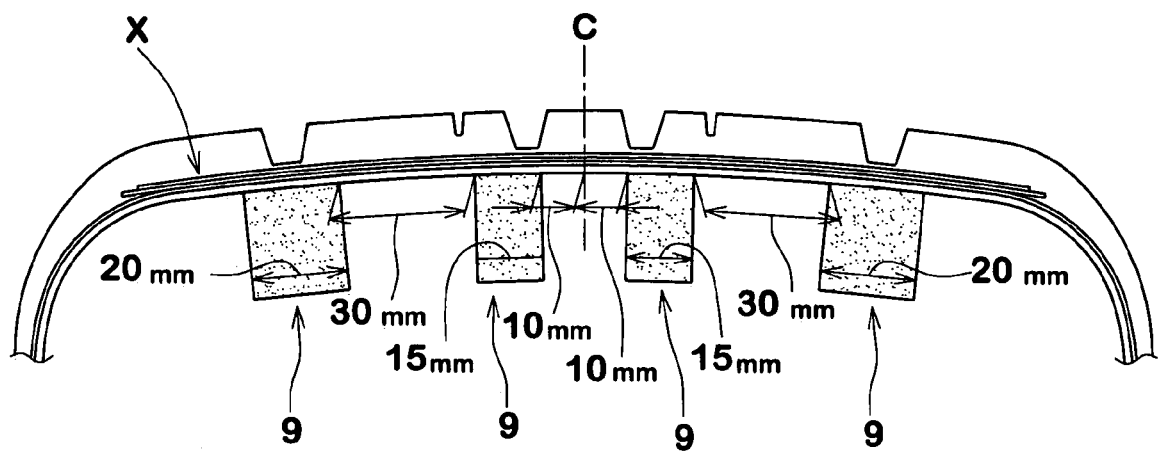

| Tire | Ref. 1 | Ref. 2 | Ex. 1 | Ex. 2 | Ex. 3 | Ex. 4 | Ex. 5 |
|---|---|---|---|---|---|---|---|
| Arrangement | FIG. 13 | FIG. 14 | FIG. 15 | FIG. 16 | FIG. 17 | FIG. 18 | FIG. 19 |
| Number of noise damper | 0 | 1 | 2 | 3 | 3 | 2 | 4 |
| Total damper volume/tire-cavity volume (%) | 10.7 | | | | | | |
| Noise reduction (dB) | 0 | −9.3 | −9.1 | −9.1 | −9.3 | −9.4 | −9.3 |
| High-speed durability (km/hr)-(minute) | 300-13 | 280-10 | 290-6 | 290-0 | 290-2 | 300-5 | 300-12 |

From the test results, it was confirmed that even if a large damper is divided into small dampers, the noise damping effect is substantially not altered as far as the total volume is not changed. In case of a tread pattern symmetrical about the tire equator, a symmetrical damper structure is preferable to a dissymmetrical damper structure in respect to the high-speed durability. Further, by disposing small dampers immediately inside the main grooves, the high-speed durability is remarkably improved.

Further, in order to examine adverse affect of the over coating 11 on the noise damping effect, comparison tests were made between the damper with the outer coating and the damper without outer coating.

Test tires having the same structure except for the damper structure were prepared and a high-speed vibration test and the above-mentioned noise performance test were conducted.

The tires used were a radial tire of size 195/65R15 91 S for passenger cars. The wheel rim size was 15×6 JJ. The volume of the tire cavity was 30500 cc. The total damper volume was 3822 cc (12.5% of the tire cavity). In the same manner as above, a bladder with a smooth surface was used. The noise damper was made from the same martial as above. The ends were tapered at 45 degrees. The width, thickness and length of the strip were 70 mm, 30 mm and 1850 mm, respectively.

In Ref. 1 tire, a noise damper was not provided.

In Ref. 2 tire, as shown in FIG. 14, a single noise damper without the outer coating was secured in the center of the tread portion with the double-sided adhesive tape.

In Exs. 1 and 2, as shown in FIG. 3, a single noise damper 9 with the outer coating 11 was secured in the center of the tread portion with the double-sided adhesive tape.

The outer coating was formed by wrapping a plastic film as shown in FIGS. 9–11. In Ex. 1, a food wrap polyethylene film manufactured by Itochu Sunplus was used. In Ex. 2, a polyethylene film manufactured by SANYU Co. Ltd. was used. The thicknesses are shown in Table 2. The film was fixed to the strip with a double-sided adhesive tape (Nitto Denko Corp. Product code 5000NS). The damper was fixed to the tire inner surface with the same tape.

Noise Test:

Using a Japanese 2000 cc FF passenger car, the test was conducted in the same manner as above. The results are indicated in Table 2 in dB based on Ref. 1 being zero dB.

Vibration Test:

The test tire was held vertically, and 3000 cc water was poured into the tire hollow, and one hour later, the water was drained by hand as much as possible. Then, the tire was mounted on the wheel rim and attached to the above-mentioned test car, and during running on a tire test circuit course at a speed 100 km/hr, vibrations were evaluated by the test driver. The test results are shown in Table 2.

TABLE 2

| Tire | Ref. 1 | Ref. 2 | Ex. 1 | Ex. 2 |
|---|---|---|---|---|
| Number of noise damper | 0 | 1 | 1 | 1 |
| Outer coating | — | non | provided | provided |
| Film thickness [mm] | — | — | 0.06 | 0.06 |
| Tire weight increase *1 (kg) | 0.01 | 0.36 | 0.01 | 0.01 |
| Noise reduction (dB) | 0 | −10.3 | −10.5 | −10 |
| vibration | non | occured | non | non |

*1) corresponding to total weight of the damper

From the test results, it was confirmed that the noise damping effect of the damper is not decreased by the over coating, and vibrations during high-speed running due to the absorbed water can be effectively prevented.

The invention claimed is:

1. A pneumatic tire comprising
a tread portion,
a pair of sidewall portions,
a pair of axially spaced bead portions,
an annular tire hollow forming a closed tire cavity when the tire is mounted on a wheel rim,
a plurality of noise dampers each made of a spongelike multi-cellular material and disposed in the tire hollow, the noise dampers secured to an inner surface of the tread portion to extend in the circumferential direction of the tire at axially different positions, and
the total volume of the noise dampers being in a range of from 0.4 to 20% of a volume of the tire cavity, wherein
at least one of the noise dampers is provided with a water-impermeable outer coating to prevent water from infiltrating into the spongelike multi-cellular material, wherein
the outer coating is a flexible film having a thickness of from 0.01 to 0.10 mm and watertightly wrapping the noise damper, and
the film is fixed to a radially outer surface of the noise damper by being sandwiched between said radially outer surface of the noise damper and said inner surface of the tread portion.

2. The pneumatic tire according to claim 1, wherein the specific gravity of the spongelike multi-cellular material is in a range of 0.005 to 0.06.

3. The pneumatic tire according to claim 2, wherein the spongelike multi-cellular material is an open-cell type foamed elastic material.

4. The pneumatic tire according to claim 1, wherein the film is unfixed to a surface of the noise damper other than said radially outer surface, and the unfixed surface includes a radially inner surface and side surfaces.

5. The pneumatic tire according to claim 1, wherein the film is unfixed to a surface of the noise damper other than said radially outer surface, and
the film wraps the noise damper loosely.

6. A pneumatic tire comprising
a tread portion,
a pair of sidewall portions,
a pair of axially spaced bead portions,
an annular tire hollow forming a closed tire cavity when the tire is mounted on a wheel rim,
a noise damper made of a spongelike multi-cellular material and disposed in the tire hollow to extend in the circumferential direction of the tire, and
the noise damper provided with a water-impermeable outer coating to prevent water from infiltrating into the spongelike multi-cellular material, wherein
the outer coating is a flexible film having a thickness of from 0.01 to 0.10 mm and watertightly wrapping the noise damper, and
the film is fixed to a radially outer surface of the noise damper by being sandwiched between said radially outer surface of the noise damper and said inner surface of the tread portion, but the film is unfixed to a surface of the noise damper other than said radially outer surface.

7. The pneumatic tire according to claim 6, wherein the unfixed surface includes a radially inner surface and side surfaces.

8. The pneumatic tire according to claim 6, wherein the film wraps the noise damper loosely.

9. The pneumatic tire according to claim 6, wherein the volume of the noise dampers is in a range of from 0.4 to 20% of a volume of the tire cavity, and
the specific gravity of the spongelike multi-cellular material is in a range of 0.005 to 0.06.

10. The pneumatic tire according to claim 6, wherein the spongelike multi-cellular material is an open-cell type foamed elastic material.

* * * * *